Patented Jan. 9, 1940

2,186,734

UNITED STATES PATENT OFFICE 2,186,734

COLOR PHOTOGRAPHY

Wilhelm Schneider, Dessau, Germany, assignor, by mesne assignments, to Agfa Ansco Corporation, Binghamton, N. Y., a corporation of Delaware No Drawing. Application October 29, 1937, Serial No. 171,701. In Germany November 2, 1936

11 Claims. (Cl. 95—6)

My present invention relates to color photography and more particularly to color-forming development.

It has already been proposed to add to silver halide emulsions dyestuff coupling components which are fast to diffusion with respect to the binding agent of the emulsion. Such dyestuff components are obtained by introducing into the component a suitable group, namely one which lends to the molecule of the color former a substantive character, or a radical of a highly polymeric carboxylic acid or a derivative thereof or an aliphatic carbon chain having more than 5 carbon atoms or a radical of a carbohydrate or a polypeptide radical or a radical of a natural resin or a sterol radical. If the polymerisation product contains several reactive groups the latter may be built up of several molecular radicals yielding dyestuffs.

It is an object of my present invention to provide dyestuff components for color-forming development which in addition to being fast to diffusion produce dyestuffs having distinctly increased dyeing capacity as against the dyestuff components hitherto in use.

A further object is the provision of dyestuff forming components soluble in aqueous alkaline liquids.

A further object is the provision of a photographic element comprising the aforementioned dyestuff components.

Further objects will be apparent from the detailed specification following hereafter.

I have discovered that particularly useful dyestuff formers fast to diffusion may be produced by coupling the color yielding groups several times periodically to produce a chain formed molecule. As color yielding groups there may be used, for example, acetoacetic ester, bromacetoacetic ester, acetoacetic anilide, cyanoacetic ester, benzoylacetic ester, benzoylacetic acid anilide, terephthaloylacetic ester, hydrindenes such as for instance diketohydrindene, pyrazolones such as for instance 1-phenyl-3-methyl-pyrazolone, 1-phenyl-3-phenyl-pyrazolone, coumaranone, malonic acid anilide-, omega-cyanoacetophenone, hydroxythionaphthene etc. There are further used phenols such as for example meta-aminophenol, o-o'-dinaphthol, o-hydroxy-diphenyl, o-o'-dihydroxydiphenyl, substituted naphthols as for instance α-naphthol, dinaphthol, 1.5-hydroxynaphthol, chloronaphthol and trichloronaphthol, substituted aminonaphthols, for instance 1.5-aminonaphthol, phenolcarboxylic acids, for instance salicylic acid, naphthol carbonic acids, for instance α-hydroxynaphthoic acid. Of the benzene and naphthalene derivatives those hydroxy compounds are especially suitable which in p-position to the hydroxy group have either no substituent at all or a negative substituent such as for instance chlorine, sulfonic acid. Also other substitution products of the above named compounds may be used, such as for instance nitro derivatives. These color yielding groups are condensed under suitable conditions with formaldehyde, formaldehyde derivatives or agents yielding formaldehyde or dialcohols; for example, from meta-cresol and formaldehyde there are produced polydiphenylmethane derivatives which contain several groups capable of forming a dye.

The color formers thus obtained have the advantage that they possess a higher degree of dyeing capacity than the other color formers fast to diffusion have, since here a molecule of about the same size has several coupling positions. In this manner all the colors of the spectrum may be obtained, particularly the darker color tints.

For example, by condensing meta-cresol with formaldehyde there is obtained a polymeric diphenylmethane derivative which yields a blue dyestuff by color development. From products the structure of which is based upon the acetoacetic-hydroxyanilide there are obtained color formers which yield yellow tints. With the aid of color formers derived from hydroxyphenyl-3-methyl pyrazolone there are obtained red dyestuffs. These bodies dissolve very easily in the suitable proportion of caustic lye or other inorganic or organic base and the solution when diluted with water may be introduced into the gelatine or the emulsion. It is advantageous to enhance the water solubility or alkali solubility of the body by sulfonation or preliminary introduction of a carboxyl group or a group lending solubility in water. The color formers may be added to the emulsion at any point of the process of production.

The silver halide emulsion having color formers which are thus obtained may be worked up into photographic layers in known manner, one or more layers being superimposed on one or both sides of the carrier as desired. The layers may be used for black-and-white exposures or for color photography. For the latter purpose the layers are sensitized respectively for different regions of the spectrum. If desired several color components may be introduced into one layer and these may be so selected that by development a neutral gray image is produced.

The emulsions may, however, be worked up in a different manner, for example differently sensitized emulsions having different color formers may be distributed on a carrier in the form of small particles.

The color picture may be produced in many ways, for example as described in U. S. Patents 2,179,228, 2,179,238 and 2,178,612 and U. S. Patent applications Ser. No. 94,340 filed August 5, 1936 and Ser. No. 141,093 filed May 6, 1937.

In the exposed emulsion layers the images may be produced by simple color forming development or by reversal development as described in U. S. Patent 2,179,234. Or the picture may be produced in multilayer material, each layer containing one of said dyestuff components, by exposing the material, developing to black and white, in for instance Amidol, dissolving silver from the negative so produced by bleaching in for example a chromic acid bath, forming images in the remaining silver halide, developing in a developer such as is used above, forming silver halide images by treatment in a bleaching bath i. e. again of chromic acid, forming latent images, transforming the images into silver and color images in a developer capable of forming dyestuffs with said dyestuff component, removing the developed silver and fixing in thiosulfate. When producing color pictures the silver is in most cases completely removed.

The following examples illustrate the invention:

Example 1

A solution of 2.5 cc. of concentrated sulfuric acid in 10 cc. of glacial acetic acid is gradually added at 20-25° C. to a solution of 16.8 grams of para-cresol dialcohol and 10.8 grams of metacresol in 40 cc. of glacial acetic acid. The mixture is allowed to stand overnight and then precipitated by addition of hot water. The filtered and washed product is dissolved in caustic soda lye, precipitated from this solution by means of hydrochloric acid and extracted several times with boiling water.

The exposed emulsion yields a blue picture by color forming development by means of para-phenylenediamine derivatives.

Example 2

A solution of 2.5 cc. of concentrated sulfuric acid in 10 cc. of glacial acetic acid is added gradually at 20-25° C. to a solution of 16.8 grams of para-cresoldialcohol and 19 grams of para-hydroxy-phenyl-3-methyl pyrazolone in 14 cc. of glacial acetic acid. After long standing the condensation product which has thus formed is precipitated by adding hot water.

The washed product is dissolved in caustic soda lye, precipitated from the solution by means of hydrochloric acid and extracted several times with boiling water. About 10 grams of this product are dissolved in caustic soda lye and the solution is added to 1 kilo of photographic emulsion which is then poured to form a layer in the known manner.

The exposed silver halide layer yields on color forming development a red picture.

Example 3

Into a solution of 16.8 grams of para-cresol dialcohol and 25.5 grams of benzoylacetic-hydroxyanilide there is allowed to flow gradually a solution of 2.5 cc. of concentrated sulfuric acid in 10 cc. of glacial acetic acid. After long standing the condensation product thus formed is precipitated by means of hot water. For purification the precipitate is dissolved in caustic soda lye and reprecipitated by means of hydrochloric acid, whereafter it is extracted several times with boiling water. About 10 grams of this condensation product are dissolved in caustic soda lye and the solution is added to 1 kilo of photographic emulsion, which is then poured in the usual manner to form a layer.

In the exposed emulsion layer a yellow picture is obtained by color forming development.

Example 4

The photographic emulsion layer made as described in Example 2 is exposed and then developed with any desired black and white developer. The silver image thus obtained is converted as described in U. S. Patent 2,179,228 into a β-naphthalene anti-diazotate. The anti-diazotate is coupled with a dyestuff component to obtain a color picture.

Example 5

The silver halide emulsion made as described in Example 3 is exposed and developed by means of any desired black and white developer and is then treated with a solution of tetrazotized benzidine disulfonic acid whereby there is first produced a yellow dyestuff distributed uniformly in the layer. By treating the layer with a suitable bleaching solution, for example as described in British Patent 401,340 there is obtained a yellow picture.

Example 6

Into a mixture of 10 grams of p-cresol and 10 grams of m-cresol in 200 cc. of glacial acetic acid there are poured slowly a solution of 5 grams of paraldehyde in 60 cc. glacial acetic acid plus 2.5 cc. of concentrated sulfuric acid. After standing for some time the condensation product which has been formed is precipitated by means of hot water. The precipitate is washed and dissolved in sodium hydroxide for the purpose of purification and reprecipitated with hydrochloric acid and boiled up with water several times. About 10 grams of this product are dissolved in sodium hydroxide and added to one kilo of a photographic emulsion, and cast in the usual manner. A blue picture is obtained by color forming development in the exposed emulsion layer.

Example 7

10.8 grams of m-cresol and 10.6 grams of benzaldehyde are dissolved in glacial acetic acid. A solution of 5 cc. of concentrated sulfuric acid in 40 cc. of glacial acetic acid are added to the mixture. After some time the condensation product which is formed is precipitated with water, washed, dissolved in sodium hydroxide for the purpose of purification, and reprecipitated with dilute hydrochloric acid. About 10 grams of this product are dissolved in sodium hydroxide and added to 1 kilo of photographic emulsion, and cast in the usual manner.

The blue picture is formed by color forming development in the exposed emulsion layer.

Example 8

42 grams of m-cresol and 21 grams of diphenyl-dialdehyde are dissolved in 300 cc. of glacial acetic acid and a solution of 5 cc. of concentrated sulfuric acid and 60 cc. of glacial acetic acid are slowly added. The condensation product is worked up as in the foregoing examples.

Example 9

100 grams of m-cresol and 100 grams of p-cresol are added to 200 grams of concentrated sulfuric acid having the temperature of 0° C. Into the mixture which is cooled further there are incorporated 120 grams thionyl chloride. The product of reaction is poured onto ice and washed until neutral. For purification it is dissolved in sodium hydroxide and precipitated with acetic acid. About 10 grams of the condensation product are dissolved in sodium hydroxide and added to 1 kilo of a photographic emulsion, which is cast in known manner.

A blue picture is obtained in the exposed emulsion layer by color forming development.

What I claim is:

1. A silver halide emulsion containing a dyestuff component for color forming development said dyestuff component being fast to diffusion and having a polymeric molecule consisting of a chain of more than two known color forming development components joined together by the reaction with a member of the class consisting of aldehydes, dialcohols and thionylhalides.

2. A silver halide emulsion containing a dyestuff component for color forming development said dyestuff component being fast to diffusion and having a polymeric molecule consisting of a chain of more than two known color forming development components joined together by the reaction with aldehydes.

3. A silver halide emulsion containing a dyestuff component for color forming development said dyestuff component being fast to diffusion and having a polymeric molecule consisting of a chain of more than two known color forming development components joined together by the reaction with dialcohols.

4. A silver halide emulsion containing a dyestuff component for color forming development said dyestuff component being fast to diffusion and having a polymeric molecule consisting of a chain of more than two known color forming development components joined together by the reaction with thionylhalides.

5. A silver halide gelatine emulsion containing a dyestuff component capable of color forming development and azo dye formation, said dyestuff component being fast to diffusion and having a polymeric molecule consisting of a chain of more than two known color forming development components joined together by the reaction with a member of the class consisting of aldehydes, dialcohols and thionylhalides.

6. The silver halide emulsion defined in claim 2 wherein the aldehyde is selected from the class consisting of formaldehyde, paraldehyde, benzaldehyde and diphenyldialdehyde.

7. The silver halide emulsion defined in claim 3 wherein the dialcohol is para-cresol dialcohol.

8. The silver halide emulsion defined in claim 4 wherein the thionylhalide is thionyl chloride.

9. A silver halide gelatine emulsion containing a dyestuff component for color forming development, said dyestuff component being fast to diffusion and having a polymeric molecule resulting from the reaction of p-cresoldialcohol with a pyrazolone.

10. A silver halide gelatine emulsion containing a dyestuff component for color forming development, said dyestuff component being fast to diffusion and having a polymeric molecule resulting from the reaction of a cresol with paraldehyde.

11. A silver halide gelatine emulsion containing a dyestuff component for color forming development, said dyestuff component being fast to diffusion and having a polymeric molecule resulting from the reaction of a cresol with thionyl chloride.

WILHELM SCHNEIDER.